UNITED STATES PATENT OFFICE.

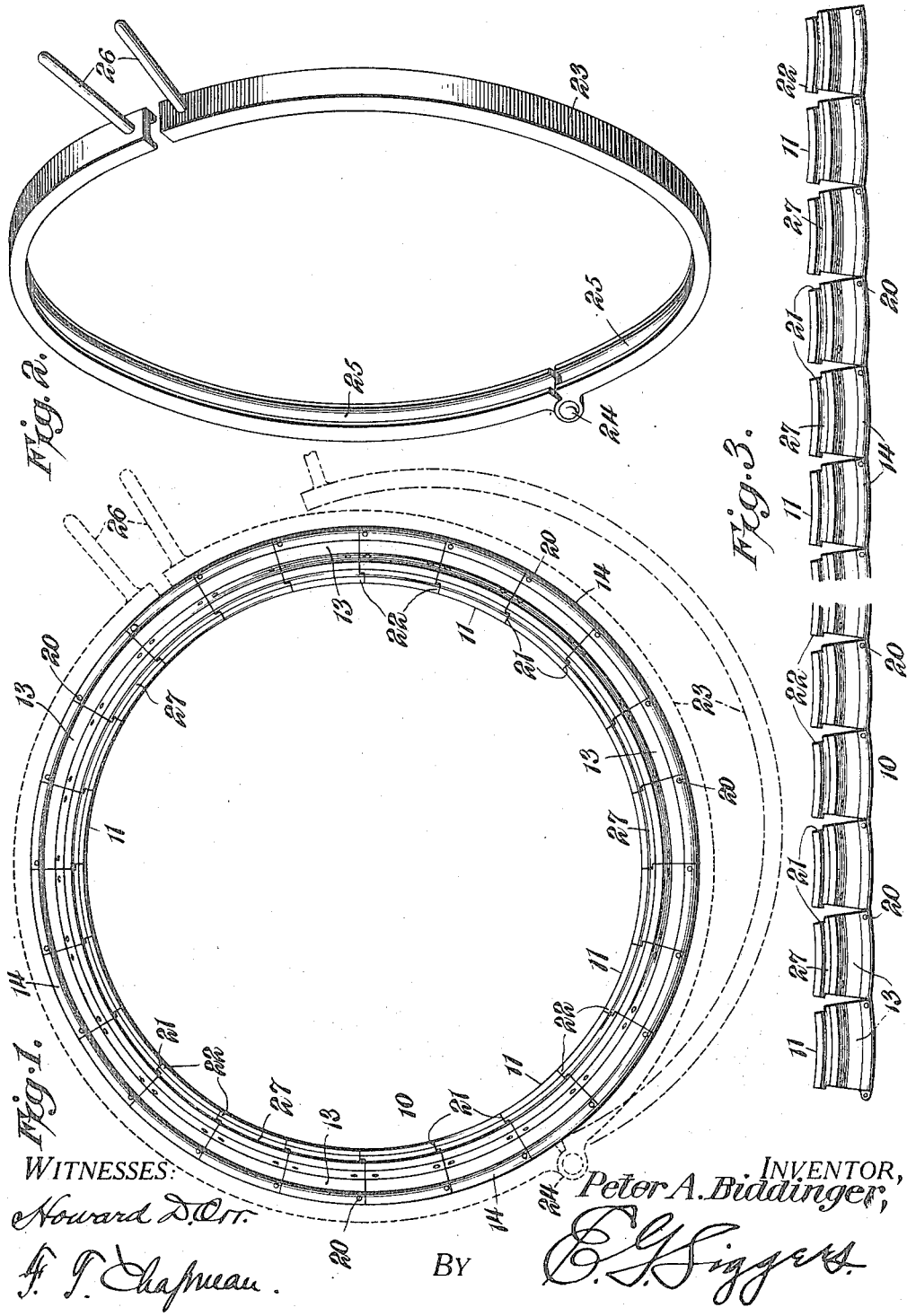

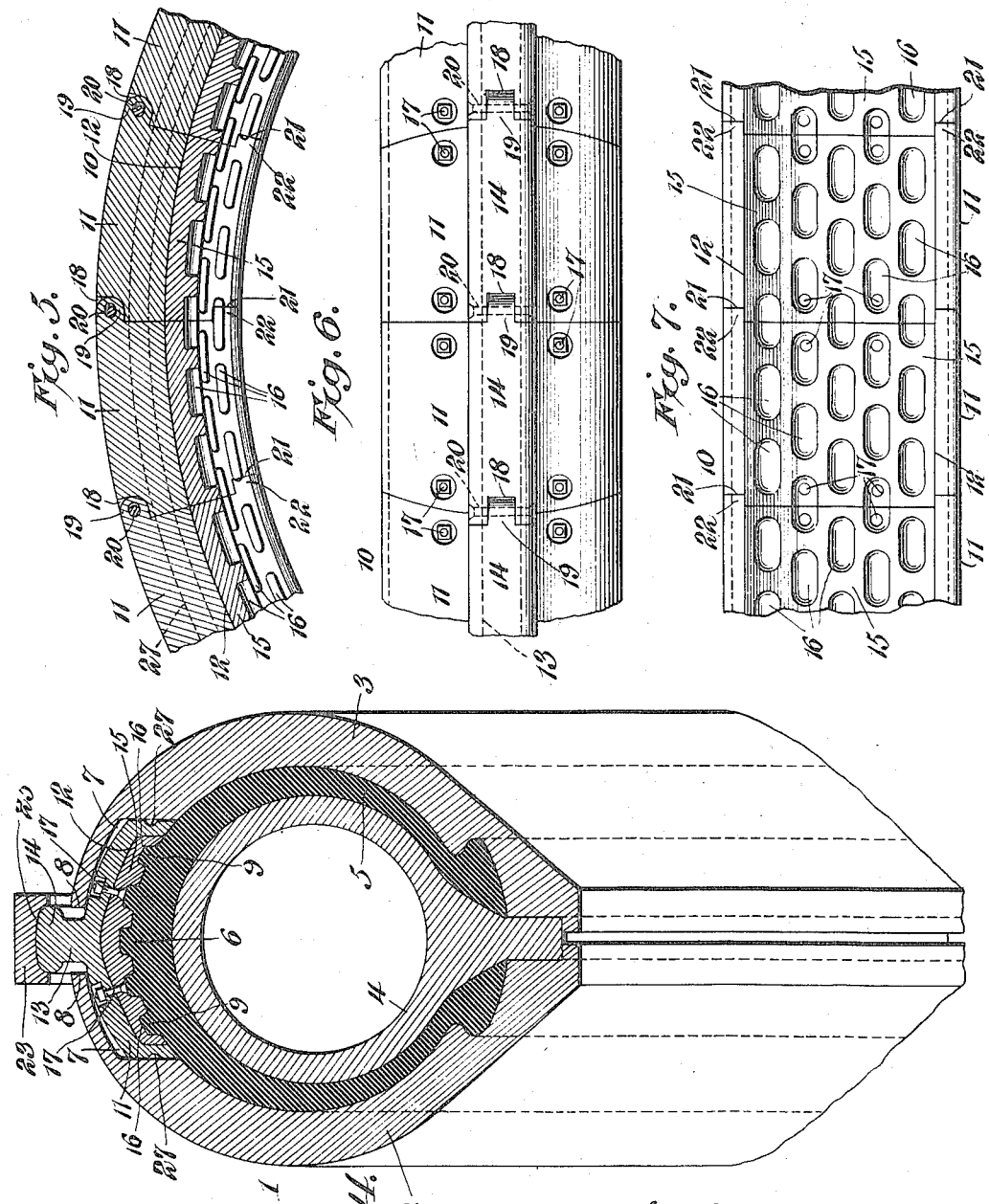

PETER A. BIDDINGER, OF MANSFIELD, OHIO, ASSIGNOR OF ONE-HALF TO ARNOLD KALLMERTEN, OF MANSFIELD, OHIO.

MOLD EQUIPMENT FOR FORMING TREADS ON PNEUMATIC TIRES.

1,197,253. Specification of Letters Patent. Patented Sept. 5, 1916.

Application filed March 13, 1916. Serial No. 83,930.

*To all whom it may concern:*

Be it known that I, PETER A. BIDDINGER, a citizen of the United States, residing at Mansfield, in the county of Richland and State of Ohio, have invented a new and useful Mold Equipment for Forming Treads on Pneumatic Tires, of which the following is a specification.

This invention has reference to mold equipments for forming treads on pneumatic tires, and its object is to provide means for use in curing the tires, whereby interchangeability is provided with respect to the part of the mold utilized in the formation of non-skid treads.

In the ordinary practice of curing pneumatic tires there are employed as many different kinds of molds as there are different treads, wherefore a fully equipped curing room must of necessity be provided with a large stock of molds. Under such circumstances there is a constant liability of mistakes in the employment of the wrong mold for a tire and also a constant liability of causing buckling of the fabric directly under the tread of the tire, such buckling being one of the worst defects in tires, so that such tires are always disposed of at a large discount, and usually below shop cost.

In accordance with the present invention there is provided a belt of a length to encircle the tread portion of the tire and lie within the mold in a channel cut to receive the belt, which latter is made up of many sections or links hinged together with those parts designed to form the tread surface removable. With such an arrangement a single belt may be readily changed so far as its molding face is concerned in accordance with the particular type of non-skid conformation desired. Such a belt is made of a length corresponding to the circumference of the tire and by providing a certain looseness of connection between the links of the belt the latter may be compressed by means independent of and exterior to the mold, whereby the rubber of the tread is forced toward the fabric of the core, thus absolutely preventing the pulling away of the fabric from the core, and consequently avoiding buckling. Moreover, the arrangement referred to brings about the desired density of the tread of the tire because any degree of compression may be applied thereto. The closer grain thereby brought about in the tread of the tire results in greater durability of such part of the tire under the conditions of use.

The device of the present invention facilitates the standardizing of treads of different non-skid conformation at a very small expense, and, furthermore, the condition known as air blistering of the tread of the tire is eliminated. The invention also makes it possible to produce a heavier tread and deeper corrugations than with the customary equipment for curing tires.

The present invention may be applied to molds already in existence, thus avoiding discarding or scrapping them, while with new molds provision may be made initially to accommodate the tread forming belt of the present invention.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—Figure 1 is a face view of the assembled belt with the ends joined together, and showing in dotted lines a clamp member exterior thereto. Fig. 2 is a perspective view of the clamp member. Fig. 3 is a side view of the belt spread out lengthwise. Fig. 4 is a cross-section of a mold with the belt applied and showing a tire inclosed in the mold in the usual position for curing. Fig. 5 is a longitudinal section through a fragment of the belt on the scale of Fig. 4. Fig. 6 is a top view of the structure of Fig. 5. Fig. 7 is a bottom view of the structure of Fig. 5.

Referring to the drawings, and particularly to Fig. 4, there is shown a two-part mold 1 made up of sections 2, 3, respectively, and with this mold there is used a central core 4, the mold and core being substantially the same as are customarily used in the curing of pneumatic tires, and hence in the main need no particular description. In the mold as shown in Fig. 4 there is also shown a tire outer casing 5, the showing being largely schematic and without any attempt at illustrating the structure of the tire, since the present invention has to do particularly with the formation of the tread portion of the tire shown at 6.

The two parts of the mold where corresponding to the tread portion 6 of the tire are circumferentially channeled, as indicated at 7, and what would ordinarily constitute the meeting edges of the mold at the tread portion of the tire are cut back, as indicated at 8, to accommodate certain structures to be described.

The tread of the tire is indicated in Fig. 4 as having non-skid protuberances 9, and the showing of the drawings, while limited to one form of non-skid proturbance, may be taken as indicative of any non-skid conformation which it is desired to use, there being many such forms in existence.

Referring now to the other figures of the drawing in addition to Fig. 4, there is shown a belt 10 made up of many block-like links 11, each formed on what may be considered its inner face with a channel 12 and on the other face with a central longitudinal web 13 terminating at the outer end in a lateral flange 14 extending to both sides of the web 13. The blocks 11 are each of segmental form, so that when placed in end to end contact they define a ring of a circumference about that of the tread portion of the tire to be cured.

Lodged in the channel 12 of each block or link 11 is a molding plate 15 having cavities 16 where presented toward the tread portion of the tire, but these cavities are to be taken as indicative of any suitable molding arrangement varying in accordance with the particular character of the non-skid tread which it is desired to form. The cavities 16 produce the projections 9, and if they be otherwise formed than as cavities, or otherwise arranged than as indicated in the drawings, other non-skid designs will be thereby produced. The molding plates 15 are held to the blocks 11 by bolts 17 or otherwise, so that the molding plates may be readily removed and other tread mold plates may be substituted without requiring additional belts or a large stock of such belts.

Each block 11 in the flange portion 14 is formed at one end with a recess 18 and at the other end with an ear 19, the ear of one block fitting in the recess of the next block in order. These ears are held in the recesses by pivot pins 20, so that the blocks are hinged together end to end and constitute the links of the belt 10, the meeting faces of the blocks being radial to the axis of the ring. At the margins of the tread side of the ring blocks, each block at one end is formed with a notch 21 entered by a projection 22 on the next succeeding block, so that the joint is there more or less tortuous and the rubber of the tread when under compression does not readily find its way thereinto.

The pins 20 are made to fit in the ears 19 or in the bodies of the blocks on opposite sides of the recesses 18 somewhat loosely, so that there is a little play in the hinge connection. This permits placing of the belt about a tire with the blocks slightly separated at their meeting ends, so that on the application of external pressure the diameter of the ring is reduced sufficiently to take up the looseness between the blocks and thereby cause the exertion of considerable pressure on the tread portion of the tire. This results in a compacting of the rubber and the production of a desirable density in the tread portion of the tire when the latter is cured, so that the durability of the tread portion of the tire is correspondingly increased.

The hinge or pivot pins 20 are all permanently secured in place with the exception of one, which may be inserted and removed at will so that the continuity of the belt may be broken at one place and the belt be laid out as indicated in Fig. 3 for storage or for facilitating cleansing or the change of molding plates, or the belt may be made circumferentially continuous by the insertion of a single pin. There is, therefore, no liability of the misplacing or loss of the belt links or blocks and the belts are applied to or removed from the molds with the greatest facility.

When the green tire is placed in the mold with the tread forming belt on the tread portion of the tire and the sides of the mold are brought together preparatory to the curing operation, a degree of compression of the tread portion is brought about by the engagement of the walls of the cavities 7 of the mold with the outer faces of the blocks or links making up the belt. If it be desirable to provide a greater compression of the tread molding belt on to the tread of the tire, a ring 23, made up of two parts of substantially equal size connected together by a hinge 24, may be employed. The two part ring 23 has an inner circumferential groove 25 fitting the flange 14 and handles 26 are provided at the ends of the two parts of the ring remote from the hinge 24, these handles being indicative of means for the application of forces tending to contract the ring circumferentially upon the flanges 14 to thereby compress the belt and exert corresponding compressive forces upon the tread portion of the tire. This may be done without respect to the mold, so that if it be desirable the belt can be compressed on to the tread portion of the tire wholly independently of any compressive forces exerted on the belt by the mold.

After the curing is completed it is sometimes found that the mold or the belt sticks to the tire and as lubrication is prohibited injury is sometimes done to the tire in the endeavor to remove the mold or the tread forming belt. With the present invention this is easily overcome by lightly tapping the protruding flange portion 14 with a suitable tool, thus loosening the mold faces from the material being molded and permitting the removal of the molding structures without harm to the cured tire.

The belt is made of many short blocks or links of which twenty-four or more may be used. This provides for even pressure and prevents buckling. The meeting ends of the many links provide for the escape of air without the necessity of having special vents for the purpose. The projections 22 keep the rubber from there overflowing, while at each side of the belt is an overflow space 27 so arranged with relation to the mold that when the molds are close together such space is not actually closed and leaves sufficient room for the reception of surplus rubber from the tire.

It is not necessary that the molding faces of the belt be made separately from the blocks, for each molding plate 15 may be an integral part of the corresponding block 11, in which case the bolts 17 are, of course, omitted.

What is claimed is:—

1. A tread forming attachment for tire curing molds comprising a belt made up of a series of blocks hinged together with means at the ends of the series for connecting the end blocks together to form the series into a split ring of a size to embrace the tread portion of the tire to be cured.

2. A tread forming attachment for tire curing molds, comprising a belt made up of a series of blocks hinged together with means at the ends of the series for connecting the end blocks together to form the series into a split ring of a size to embrace the tread portion of the tire to be cured, the hinge connections of the blocks having play for permitting the application of pressure in a direction to force the blocks radially toward the axis of the ring for compressing the tread portion of the tire when in the curing mold.

3. A tread forming attachment for tire curing molds, comprising a belt made up of a series of blocks hinged together with means at the ends of the series for connecting the end blocks together to form the series into a split ring of a size to embrace the tread portion of the tire to be cured, the hinge connections of the blocks having play for permitting the application of pressure in a direction to force the blocks radially toward the axis of the ring for compressing the tread portion of the tire when in the curing mold, the attachment including a clamp ring consisting of a plurality of joined parts adapted to be applied to the exterior of the belt for effecting a radial compression of the belt.

4. A tread forming attachment for curing molds for pneumatic tires, comprising a multi-link belt having terminal links with means for joining them to form the belt into an endless ring for encircling the tire to be treated, each link having a circumferential channel for the reception of a molding plate formed to produce a non-skid contour to the tread portion of the tire.

5. A tread forming attachment for curing molds for pneumatic tires comprising a belt composed of a series of block like links having the links permanently hinged together in one series with the terminal links provided with means for their joinder to form the series into a continuous ring, the meeting ends of the blocks being arranged substantially radial to the axis of the ring with the inner ends of the meeting faces of adjacent blocks formed one with a recess and the other with a projection to enter the recess.

6. A tread forming attachment for curing molds for pneumatic tires comprising a belt composed of a series of block like links having the links permanently hinged together in one series with the terminal links provided with means for their joinder to form the series into a continuous ring, the meeting ends of the blocks being arranged substantially radial to the axis of the ring with the inner ends of the meeting faces of adjacent blocks formed one with a recess and the other with a projection to enter the recess, said blocks each having the inner face longitudinally recessed for the reception of a tread molding plate.

7. A tread forming attachment for curing molds for pneumatic tires comprising a belt composed of a series of block like links having the links permanently hinged together in one series with the terminal links provided with means for their joinder to form the series into a continuous ring, the meeting ends of the blocks being arranged substantially radial to the axis of the ring with the inner ends of the meeting faces of adjacent blocks formed one with a recess and the other with a projection to enter the recess, said blocks each having the inner face longitudinally recessed for the reception of a tread molding plate, the sides of each block being formed with a groove to receive surplus rubber during the curing operation.

8. A tread forming attachment for curing molds for pneumatic tires made up of a series of block-like links each of substantially segmental shape with the inner face provided with means for molding the tread of the tire and the outer face having a radial projection formed at one end with a recess and at the other end with a projecting eye adapted to the recess of the next block in order and the blocks making up the belt having the eye of one block entering the recess of the next block in order and provided with a connecting pin hingedly joining the blocks together.

9. A tread forming attachment for curing molds for pneumatic tires made up of a series of block-like links each of substantially segmental shape with the inner face provided with means for molding the tread of the tire and the outer face having a radial projection formed at one end with a recess and at the other end with a projecting eye adapted to the recess of the next block in order and the blocks making up the belt having the eye of one block entering the recess of the next block in order and provided with a connecting pin hingedly joining the blocks together, the connecting pins joining all the blocks with the exception of two blocks being normally permanently attached to the respective blocks and the one pin being readily detachable for breaking the continuity of the belt at such point to permit the belt to be laid out or to be formed into a continuous ring, at will.

10. A tread forming attachment for curing molds for pneumatic tires, comprising a belt made up of blocks hinged together in series with the bodies of the blocks adapted to be lodged in the portion of the mold corresponding to the tread portion of the tire to be cured and each block having an extension adapted to protrude from the mold with the hinge connections exterior to the mold.

11. A tread forming attachment for curing molds for pneumatic tires comprising a belt made up of a series of hingedly connected blocks adapted to be formed into a ring to encircle the tread portion of the tire to be cured, each block at its outer edge having an extension adapted to project radially beyond the mold with which the belt is used, and a divided clamp ring adapted to encircle the belt where protruding from the mold and compress the blocks of the ring radially inward against the tire being treated.

12. A tread forming attachment for curing molds for pneumatic tires, comprising a belt made up of a series of hingedly connected blocks adapted to be formed into a ring to encircle the tread portion of the tire to be cured, each block at its outer edge having an extension adapted to project radially beyond the mold with which the belt is used, and a divided clamp ring adapted to encircle the belt where protruding from the mold and compress the blocks of the ring radially inward against the tire being treated, said clamp ring having an interior circumferential channel adapted to receive the projecting portions of the applied belt.

13. The combination with a tire curing mold provided with a circumferential channel at the portion corresponding to the tread of the tire, of a belt adapted to said channeled portion of the mold and composed of a series of blocks hingedly connected together, each block having at its inner face a removable mold plate for producing a nonskid conformation of the tread of the tire and the outer side of the block having a radially continuous projection to the exterior of the mold.

14. The combination with a tire curing mold provided with a circumferential channel at the portion corresponding to the tread of the tire, of a belt adapted to said channeled portion of the mold and composed of a series of blocks hingedly connected together, each block having at its inner face a removable mold plate for producing a nonskid conformation on the tread of the tire and the outer side of the block having a radially continuous projection to the exterior of the mold, said continuations at the exterior of the mold having connections constituting the hinge connections between the blocks making up the belt.

In testimony, that I claim the foregoing as my own, I have hereto affixed my signature in the presence of two witnesses.

PETER A. BIDDINGER.

Witnesses:
 D. J. McDONALD,
 J. H. PETERSON.